United States Patent [19]
Khan et al.

[11] Patent Number: 5,841,607
[45] Date of Patent: Nov. 24, 1998

[54] HYDRODYNAMIC SEAL FOR DISC DRIVE SPINDLE MOTOR

[75] Inventors: Raquib U. Khan, Pleasanton; Mohamed M. Rahman, San Jose, both of Calif.

[73] Assignee: Seagate Technology, Inc., Scotts Valley, Calif.

[21] Appl. No.: 835,241

[22] Filed: Apr. 7, 1997

[51] Int. Cl.⁶ .................................................. G11B 17/02
[52] U.S. Cl. ......................................................... 360/99.08
[58] Field of Search .............................. 360/98.07, 99.04, 360/99.08

[56] References Cited

U.S. PATENT DOCUMENTS

| | | | |
|---|---|---|---|
| 5,142,173 | 8/1992 | Konno et al. | 310/67 |
| 5,295,028 | 3/1994 | Elsing | 360/97.01 |
| 5,323,076 | 6/1994 | Hajec | 310/90 |
| 5,473,484 | 12/1995 | Dunfield et al. | 360/99.08 |
| 5,600,511 | 2/1997 | Dunfield et al. | 360/97.02 |
| 5,600,514 | 2/1997 | Fukuzawa | 360/99.08 |

*Primary Examiner*—Robert S. Tupper
*Attorney, Agent, or Firm*—Westman, Champlin & Kelly, P.A.

[57] ABSTRACT

A disc drive includes a disc drive motor and a chassis for providing a substantially contaminant-free cavity. The disc drive motor includes a fixed member coupled to the chassis and a rotor rotatable about the fixed member for rotating a magnetic storage disc in the contaminant-free cavity. A bearing interconnects the fixed member and the rotor. A viscous pump seal is located between the contaminant-free cavity and the bearing. The viscous pump seal includes a first pump surface carried by one of the fixed member and the rotor and a second, grooved pump surface carried by the other of the fixed member and the rotor. The first and second pump surfaces are separated by a gap. The viscous pump seal inhibits transfer of contaminants from the bearing to the contaminant-free cavity.

17 Claims, 5 Drawing Sheets

Fig. 5

HYDRODYNAMIC SEAL FOR DISC DRIVE SPINDLE MOTOR

BACKGROUND OF THE INVENTION

The present invention relates generally to the field of disc drive data storage devices. More specifically, the invention relates to a hydrodynamic (viscous pump) seal for a disc drive spindle motor.

Disc drive data storage devices are well know in the industry. Such devices use rigid discs coated with a magnetizable medium with for storage of digital information in a plurality of circular concentric data tracks. The information is written to and read from the discs using a transducing head mounted on an actuator mechanism which moves the head from track to track across a surface of the disc under control of electronic circuitry. The discs are mounted for rotation on a spindle motor which causes the discs to spin and the surfaces of the discs to pass under the heads.

As magnetic storage densities have increased, magnetic disc drives have been required to operate with increasingly greater precision. This requirement has meant that magnetic recording heads have been placed increasingly close to the surface of the magnetic disc. The interaction between the magnetic head and the recording surface has also become increasingly precise. This has required the environment of the magnetic disc to be free from particulate and liquid contaminants. Typically, the disc environment is sealed during manufacture so that contaminants cannot enter the housing and contact the storage disc or the magnetic recording head. Additionally, it is important that the disc environment within the chassis remain contaminant free following manufacturing and during operation of the disc drive system. Even minute contaminants can have catastrophic results on disc operation. For example, particulate build up between the transducing head and the disc can cause degradation in the read back signal, head crashes and damage to the disc surface.

One source of particulate and liquid contaminants in the sealed chassis is the disc drive spindle motor which rotates the storage disc. The disc rotates at speeds in excess of several thousands of RPM, and the rotational speed in present day disc drives continues to increase. Although the motor is sealed, the seal in not perfect and contaminants tend to escape from the motor into the compartment containing the disc.

A number of attempts have been made to reduce the tendency of contaminants to travel from the motor to the disc compartment. For example, U.S. Pat. No. 5,011,165, issued Apr. 30, 1994, to Cap, entitled "SEALING DEVICE ESPECIALLY FOR HARD DISK DRIVES," describes a ferrofluid seal which is used to isolate the environment of the drive motor from the sealed disc environment. The ferrofluid seal is a fluidic seal made of ferrofluid which is held in place by a magnet. The fluid extends across a gap between a fixed portion of the disc drive motor and the rotor, and thereby prevents contaminants from the motor from entering the sealed disc environment. However, one problem with the ferrofluid seal is that the ferrofluid may leak from the seal and enter the disc environment which leads to the problems discussed above. Further, the ferrofluid seal may leak into the motor from which may cause damage. Additionally, leakage of the ferrofluid reduces the effective quantity of the ferrofluid in the seal, thereby reducing the effectiveness of the seal.

Another type of seal is "labyrinth" seal. Typically, a labyrinth seal is a small gap at a small diameter of the motor which extends over a long path. This arrangement tends to inhibit contaminants from the motor from escaping through the labyrinth into the sealed disc compartment. The labyrinth seal can be made more effectively be reducing the gap and lengthening the path. However, this requires precision machining which is both difficult, time consuming and expensive. Although labyrinth seals tend to be less expensive than ferrofluid seals, labyrinth seals are typically not as effective in isolating the motor from the disc environment.

There is a continual need for improving the isolation between the spindle motor in a disc drive and the contaminant-free disc environment.

SUMMARY OF THE INVENTION

The disc drive of the present invention includes a disc drive spindle motor and a chassis for providing a substantially contaminant-free cavity. The disc drive spindle motor includes a fixed member coupled to the chassis and a rotor rotatable about the fixed member for rotating a magnetic storage disc in the contaminant-free cavity. A bearing interconnects the fixed member and the rotor. A viscous pump seal is located between the contaminant-free cavity and the bearing. The viscous pump seal includes a first pump surface carried by one of the fixed member and the rotor and a second, grooved pump surface carried by the other of the fixed member and the rotor. The first and second pump surfaces are separated by a gap. The viscous pump seal inhibits transfer of contaminants from the bearing to the contaminant-free cavity.

In one embodiment, the viscous pump seal includes first and second annular plates, which are coaxial with the central axis. The first annular plate defines the first pump surface, and the second annular plate defines the second, grooved pump surface. However, grooves can be placed on both the first and second pump surfaces, in which case both pump surfaces act as an individual pump. The first and second annular plates can be press-fit or otherwise attached to the fixed member and the rotor, or can be integral with the fixed member and the rotor. The grooved pump surface or surfaces can have a spiral groove pattern or a herring bone groove pattern, for example. The spiral and herring bone groove patterns are preferably arranged to pump air from the inner radius and the outer radius of the plates toward the middle radius of the plates. This creates a pressure build-up between the plates which restricts the transfer of contaminants from the bearing to the contaminant-free cavity.

DETAILED DESCRIPTION OF THE PREFERRED EMBODIMENTS

Figure 1:
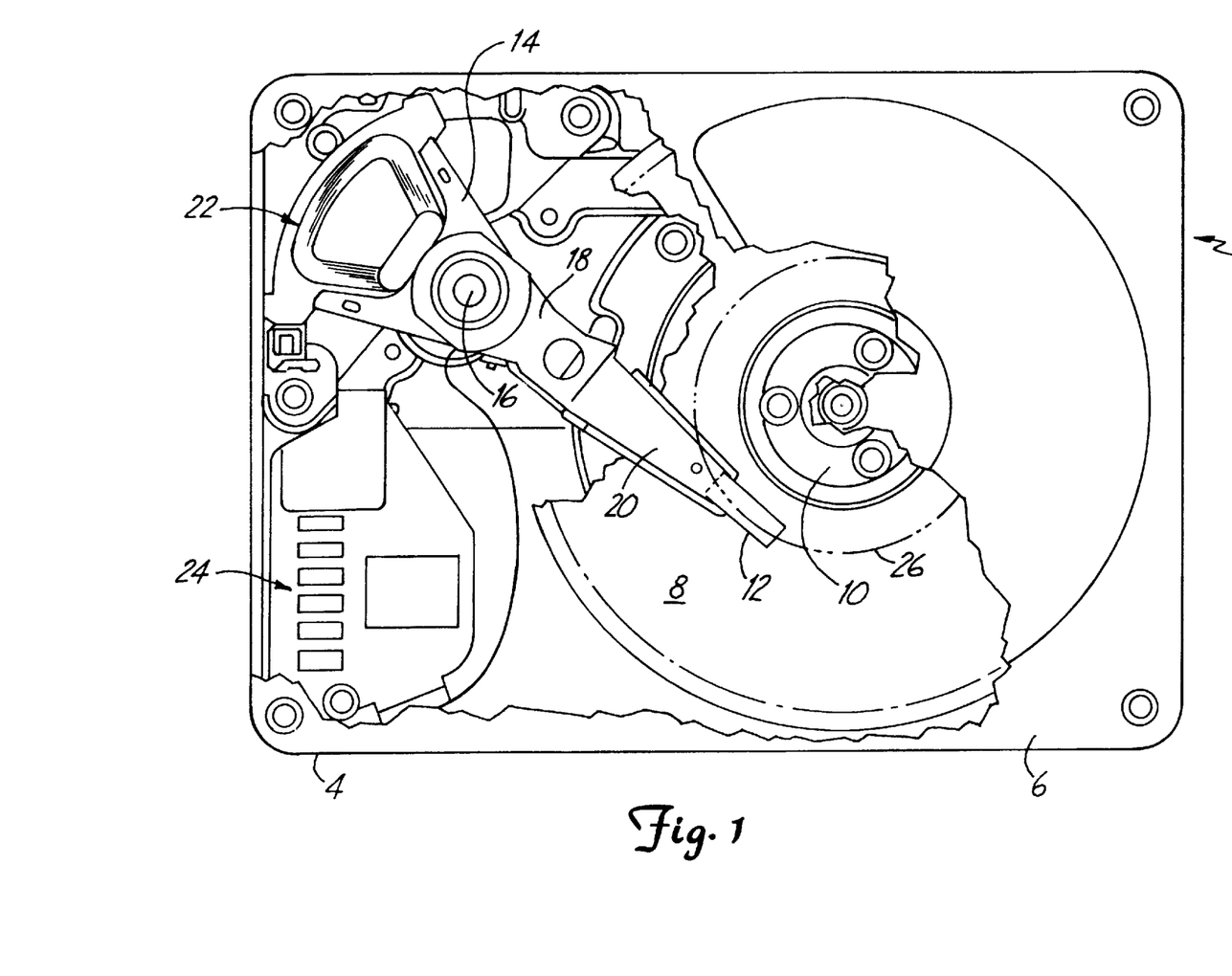
FIG. 1 is a plan view of a disc drive data storage device in which the present invention is useful.

FIG. 1 shows a plan view of a disc drive 2 for use with the present invention. Disc drive 2 includes a base member 4 to which internal components of the unit are mounted.

Base member 4 couples to top cover 6 which forms a sealed environment (cavity) for critical parts of disc drive 2.

Disc drive 2 includes a plurality of discs 8 which are mounted for rotation on a spindle motor, shown generally at 10. Motor 10 is described below in greater detail. A plurality of magnetic read/write heads 12, usually on per disc surface, are mounted to an actuator 14. In the example shown at drive 2, actuator 14 is a rotatory actuator which is mounted for pivoting about a pivot axis 16. Actuator 14 includes a number of head mounting arms 18 which couple heads 12 to the actuator body via a plurality of load beam/gimbal assemblies 20. Actuator motor 22 is also coupled to actuator body 14 to provide a force to move heads 12 to a desired position on the surface of disc 8.

Figure 2:
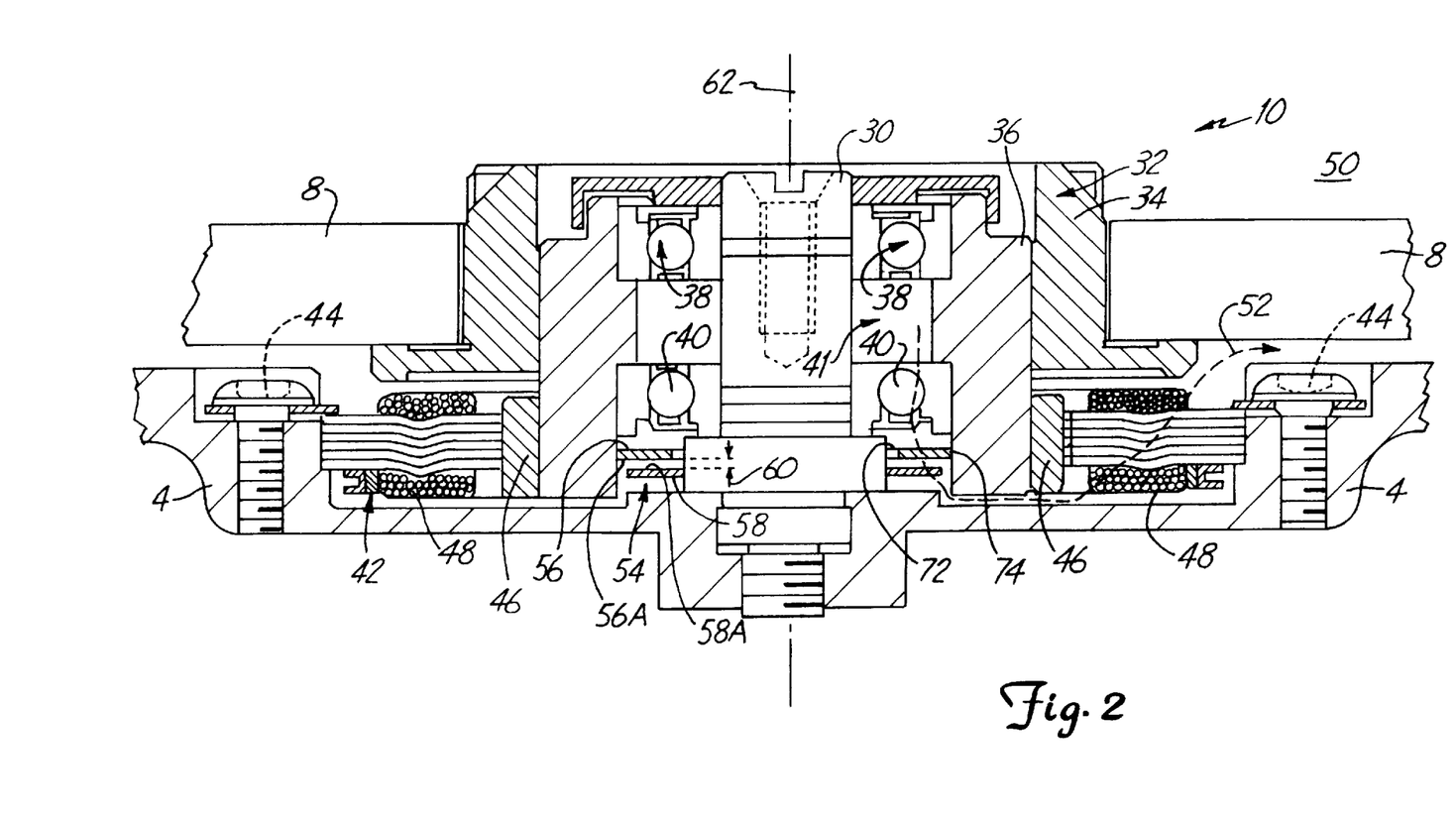
FIG. 2 is a cross-sectional view of a disc drive spindle motor according to the present invention.

FIG. 2 shows a spindle drive motor 10 of a fixed shaft design in cross section in accordance with one aspect of the invention. Drive motor 10 is mounted to base 4 and includes fixed shaft 30 which is screwed into base 4. Rotor hub 32 includes hub 34 and rotor 36 which rotate about fixed shaft 30 on upper bearing 38 and lower bearing 40. Hub 34 supports disc 8. Upper bearing 38 and lower bearing 40 are positioned within bearing cavity 41, between fixed shaft 30 and rotor 36 for rotatably coupling rotor 36 to fixed shaft 30. Stator assembly 42 is mounted to base 4 by screws 44. Permanent magnets 46 are attached to rotor 36 proximate stator assembly 42. Electrical signals supplied to windings 48 of stator assembly 42 create a magnetic field which interacts with permanent magnets 46 to cause rotor hub 32 to rotate.

Although disc 8 is contained in a sealed, contaminant-free cavity 50 formed by base 4 and cover 6, various contaminants from motor 10, such as metal particles or lubrication used with bearings 38 and 40, tend to leak from bearing cavity 41 and enter contaminant-free cavity 50, along airflow path 52. The present invention provides a hydrodynamic or "viscous pump" seal 54 which reduces the tendency of contaminants from entering contaminant-free cavity 50. Viscous pump seal 54 is positioned within air flow path 52, between rotor 36 and fixed shaft 30. Viscous pump seal 54 includes annular plates 56 and 58. Annular plate 56 is carried by rotor 36 and extends from rotor 36 toward fixed shaft 30. Annular plate 58 is carried by fixed shaft 30 and extends from fixed shaft 30 toward rotor 36.

Annular plates 56 and 58 have pump surfaces 56a and 58a which oppose one another and are separated by a gap 60. One of the pump surfaces 56a or 58a is grooved. As plate 56 rotates with rotor 36 relative to plate 58, the grooved pump surface creates a pumping action on the air within gap 60 according to viscous flow principles. The pumping action creates a pressure buildup between plates 56 and 58 which is a function of the surface area of the plates, the physical properties of the medium (e.g. air) in an ambient condition, the rotational speed rotor 36 and the width of gap 60, for example. The groove pattern determines the direction of pumping. Preferably, the direction of pumping is selected to create an airflow restriction within airflow path 52 which inhibits transfer of contaminants from bearing cavity 41 to contaminant-free cavity 50. In one embodiment, the groove pattern is selected to pump air from the outer radius and inner radius of plates 56 and 58 toward a middle radius of plates 56 and 58 such that the net flow in either direction is zero. This creates a pressure build-up between the plates that inhibits transfer of contaminants in either direction through viscous pump seal 54.

In another embodiment, the groove pattern is selected to pump air between plates 56 and 58 radially inward toward shaft 30 and thus toward bearing cavity 41, which inhibits contaminants from escaping the bearing cavity. In yet another embodiment, the axial positions of plates 56 and 58 are reversed and the groove pattern is selected to pump air radially outward toward rotor 36 and thus toward bearing cavity 41.

Plates 56 and 58 can be easily placed in any of the traditional ferrofluid seal locations by press-fitting the plates onto the inner diameter of rotor 36 and the outer diameter of shaft 30, respectively. Plates 56 and 58 can be formed of any suitable material, such as stainless steel or a cooper alloy. Alternatively, pump surfaces 56a and 58a can be formed by surface features integrated within the material of rotor 36 or shaft 30. Viscous pump seal 54 can thus replace a ferrofluid seal or be an addition in any spindle motor where contamination is a concern.

Figure 3:
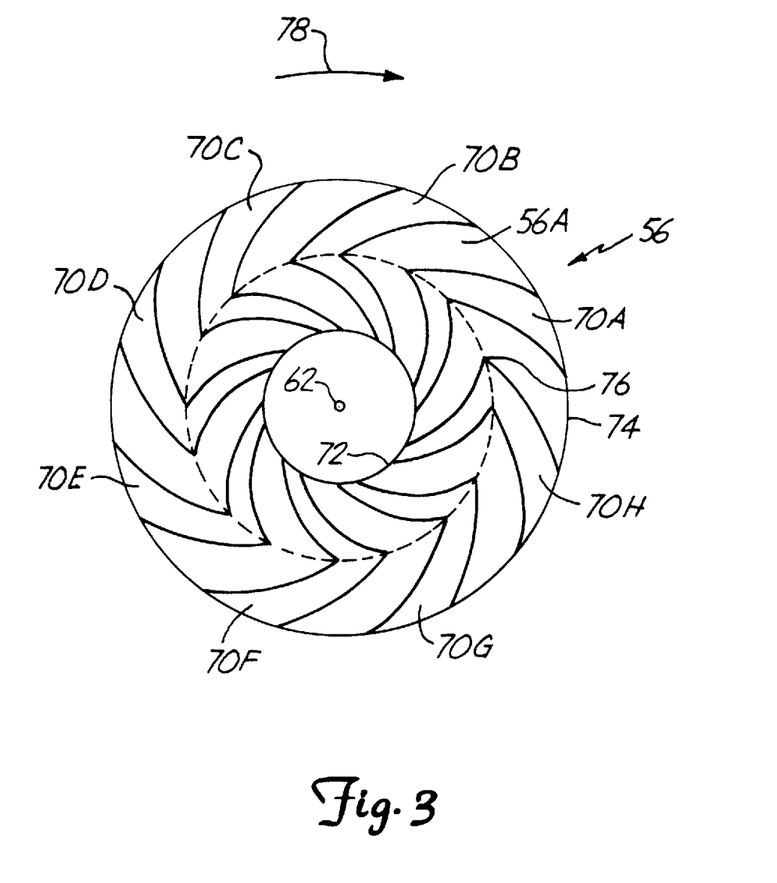
FIG. 3 is a plan view of a viscous pump plate within the spindle motor shown in FIG. 2.

FIG. 3 is a plan view of pump surface 56a of plate 56, as viewed from gap 60. Pump surface 56a has a plurality of grooves 70a–70h which have a generally V-shape, herring bone pattern. Each groove 70a–70h extends from an inner radius 72 to an outer radius 74 of plate 56 and has an apex 76 at approximately the middle radius of plate 56. Each groove 70a–70h can have a variety of cross sections, such as rectangular, semicircular or triangular. Grooves 70a–70h can also have a variety of depths and widths, depending upon the particular application. In one embodiment, grooves 70a–70h have a depth of 4–15 micrometers, with gap 60 (shown in FIG. 2) having a width of 2–10 micrometers, for example.

During operation, plate 56 rotates with rotor 36 about central axis 62 in the direction indicated by arrow 78. Grooves 70a–70h pump air within gap 60 radially outward from inner radius 72 toward the middle radius of plate 56, at apex 76, and radially inward from outer radius 74 toward the middle radius of plate 56. Pressure builds between plates 56 and 58 creating an air flow restriction within air flow path 52 (shown in FIG. 2). This air flow restriction tends to limit passage of contaminants from bearing cavity 41 to contaminant-free cavity SO.

Incompressible flow principles were applied to estimate the load and stiffness created by viscous pump seal 54 based on a narrow groove application. Although air is a compressible fluid, incompressible fluid flow principles were applied since air behaves almost like an incompressible fluid under the operating conditions of the viscous pump seal. Table 1 shows the estimated load and stiffness.

TABLE 1

| GAP (μm) | RPM | Groove Depth | Load (N) | Axial Stiffness (N/m) | P max (Pascal gauge) |
| --- | --- | --- | --- | --- | --- |
| 2 | 7000 | 4 | 1.2297 | 1.337e6 | 23,704 |
| 2 | 7000 | 11 | 0.5617 | 2.20e5 | 10,813 |
| 5 | 7000 | 11 | 0.194 | 0.79e5 | 3,728 |
| 10 | 7000 | 15 | 0.0474 | 0.121e5 | 927 |
| 10 | 7000 | 11 | 0.0404 | 0.115e5 | 832 |
| 2 | 10,000 | 4 | 1.756 | 1.91e6 | 33,863 |
| 2 | 7000 | 4 | 1.2297 | 1.337e6 | 23,704 |
| 2 | 10,000 | 11 | 0.802 | 3.15e5 | 15,448 |
| 5 | 10,000 | 11 | 0.277 | 1.13e5 | 5,326 |
| 10 | 10,000 | 15 | 0.0677 | 0.172e5 | 1,325 |
| 10 | 10,000 | 11 | 0.0577 | 0.165e5 | 1,189 |
| Example of a ferro-seal | | | | | 1,236 |

Figure 4A:
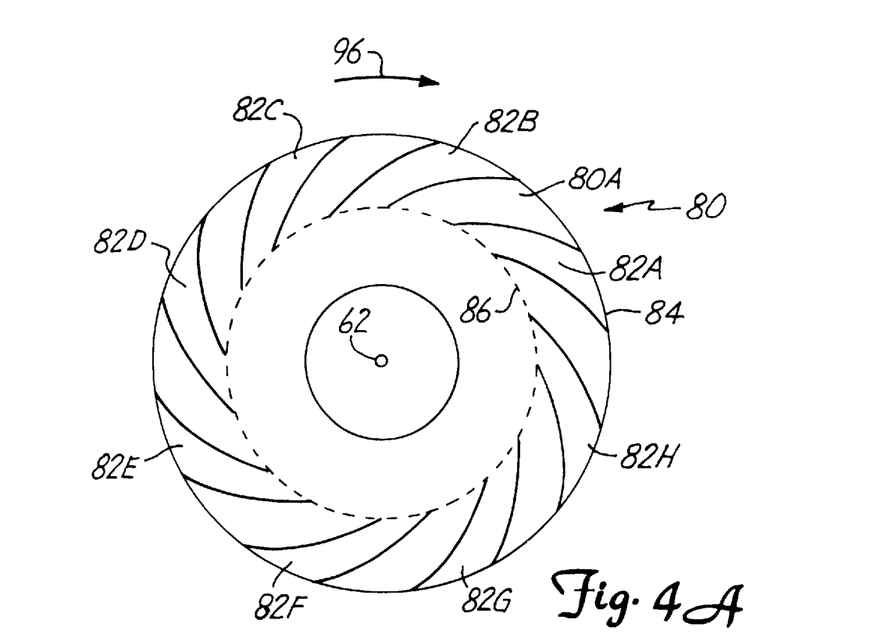
FIGS. 4a and 4b are plan views of viscous pump plates having alternative, spiral groove patterns.
Figure 4B:
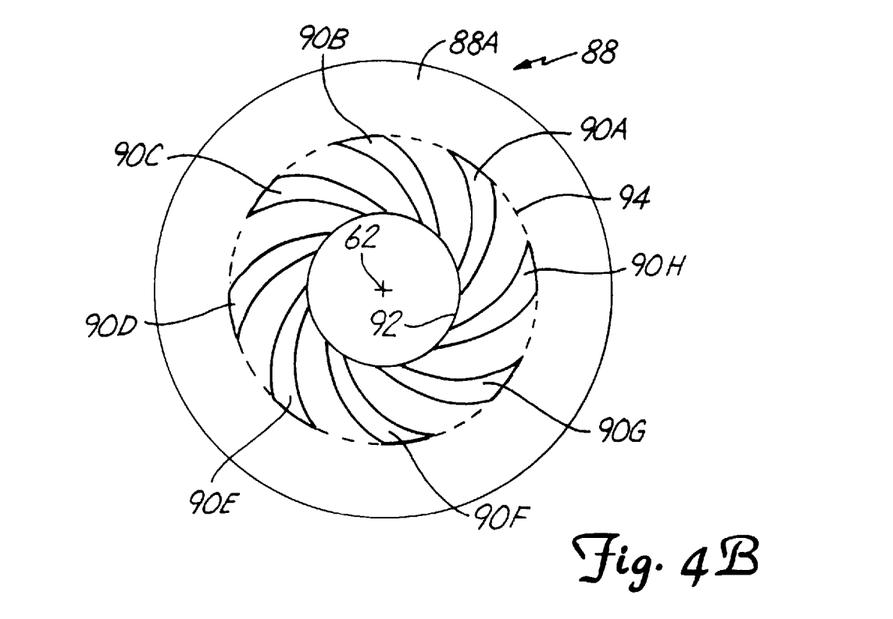

FIGS. 4a and 4b are plan views of viscous pump plates having alternative, spiral groove patterns. Plate 80 has a pump surface 80a with a plurality of spiral-shaped grooves 82a–82h which extend from outer radius 84 toward a middle radius 86 of plate 80. Plate 88 has a pump surface 88a with a plurality of spiralshaped grooves 90a–90h which extend from inner radius 92 toward a middle radius 94 of plate 88. When plate 80 is attached to the inner diameter of rotor 36 (shown in FIG. 2), similar to plate 56, and plate 88 is attached to the outer diameter of shaft 30, similar to plate 58, pump surfaces 80a and 88a oppose one another across gap 60. As plate 80 rotates in the direction of arrow 96 relative to plate 88, grooves 82a–82h of plate 80 pump air radially outward from inner radius 82 toward middle radius 86 of plate 80 and grooves 90a–90h pump air radially inward from outer radius 92 toward middle radius 94 of plate 88. This causes a pressure build-up at the middle radii 86 and 94 of plates 80 and 88 which restricts flow in either direction and thereby inhibits the transfer of contaminants from bearing cavity 41 to contaminant-free cavity 50.

In the embodiment shown in FIGS. 4a and 4b, half of the spiral groove pattern is one pump surface and the other half is on the other pump surface. The number of grooves and the length of the grooves in each pump surface is preferably selected to maintain a balance in the opposing flow rates generated by each pump surface.

Figure 5:
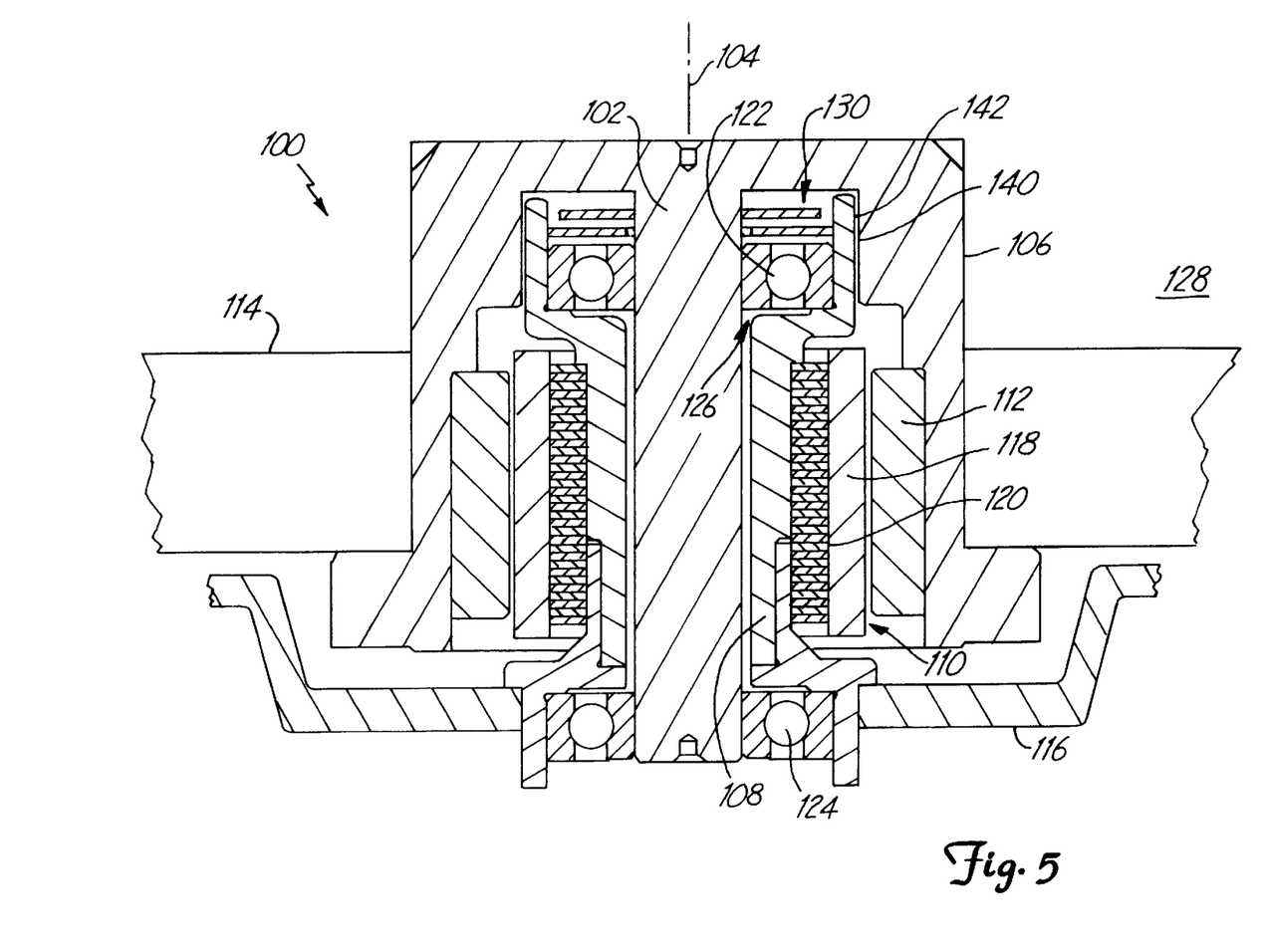
FIG. 5 is a ross-sectional view of a disc drive spindle motor according to an alternative embodiment of the present invention.

FIG. 5 is a sectional view of a disc drive spindle motor 100 having a rotating shaft 102 in accordance with an alternative embodiment of the present invention. Spindle motor 100 further includes a central axis 104, a hub 106, a stationary member 108, a stator 110 and a rotor magnet 112. Hub 106 is coupled to shaft 102 and carries a magnetic disc 114 for rotation about central axis 104. Stationary member 108 is secured to housing 116. Stator 110 is attached to the outer diameter of stationary member 108 and includes a stator winding 118 and a stator lamination 120. Rotor magnet 110 is attached to the inner diameter of hub 106. Ball bearings 122 and 124 interconnect shaft 102 with stationary member 108. Ball bearings 122 and 124 are contained within a bearing cavity 126.

As in the embodiment shown in FIG. 2, magnetic disc 114 is sealed within a substantially contamination-free cavity 128 by housing 116. A viscous pump seal 130 is positioned between shaft 102 and stationary member 108 to inhibit transfer of contaminants from bearing cavity 126 to contaminant-free cavity 128. Viscous pump seal 130 is similar to viscous pump seal 54 and can have a variety of configurations and positions in alternative embodiments. For example, viscous pump seal 130 can be placed between wall 140 of hub 106 and wall 142 of stationary member 108. The cylindrical surfaces of walls 140 and 142 would form the pump surfaces, and one or both of the pump surfaces would be grooved depending upon the type of grooves used. The grooves can have a spiral pattern or a herring bone pattern that are arranged to pump air both inward and outward toward a predetermined axial position along walls 140 and 142, for example.

The viscous pump seal of the present invention has several advantages over seals of the prior art, such as ferrofluidic seals. The viscous pump seal is contamination-free in that the seal, itself, is not a source of contamination as in ferrofluidic seals. The viscous pump seal of the present invention has an efficiency which increases with disc rotational velocity and with temperature. This allows the seal to be particularly effective in high speed spindle motor applications and in rugged environments. Further, the viscous pump seal of the present invention can be manufactured in mass production much cheaper than ferrofluidic seals and machining-intensive labyrinth seals.

Although the present invention has been described with reference to preferred embodiments, workers skilled in the art will recognize that changes may be made in form and detail without departing from the spirit and scope of the invention. For example, the viscous pump seal of the present invention can be used in both ball bearing and hydrodynamic bearing applications. The seal can be formed between a pair annular plates or between opposed pump surfaces formed on a stationary member and a rotating member in the disc drive. Either pump surface or both pump surfaces can be grooved, and the grooved pump surface or surfaces can be stationary, rotating or both. Also, the pump surfaces can have a radial or axial orientation with respect to one another.

What is claimed is:

1. A disc drive comprising:
   a housing providing a substantially contaminant-free cavity;
   a central axis;
   a stationary member which is fixed with respect to the housing and coaxial with the central axis;
   a rotatable member which is rotatable about the central axis with respect to the stationary member;
   at least one data storage disc carried by the rotatable member within the contaminant-free cavity;
   a bearing interconnecting the stationary member and the rotatable member;
   an air flow path from the bearing to the contaminant-free cavity; and
   a viscous pump seal positioned within the air flow path, between the bearing and the contaminant-free cavity, and forming an air flow restriction in the air flow path, wherein the viscous pump seal comprises first and second annular plates which are separated by a gap, wherein the first annular plate is carried by one of the stationary member and the rotatable member and defines a first pump surface facing the gap and wherein the second annular plate is carried by the other of the stationary member and the rotatable member and defines a second, grooved Pump surface facing the gap.

2. The disc drive of claim 1 wherein:
   the first annular plate is coaxial with the central axis; and
   the second annular plate is coaxial with the central axis and is axially separated from the first annular plate the gap.

3. The disc drive of claim 2 wherein:
   the first annular plate is carried by the stationary member and extends toward the rotatable member; and
   the second annular plate is carried by the rotatable member and extends toward the stationary member.

4. The disc drive of claim 2 wherein:
   the first annular plate is carried the rotatable member and extends toward the stationary member; and
   the second annular plate is carried by the stationary member and extends toward the rotatable member.

5. The disc drive of claim 2 wherein the second, grooved pump surface has a herring bone groove pattern.

6. The disc drive of claim 5 wherein the first and second pump surfaces have inner, outer and middle radii, and wherein the herring bone groove pattern is formed of a plurality of spaced, generally V-shaped grooves having an apex at approximately the middle radius, wherein the apex of each groove is oriented such that the grooves pump air from the inner and outer radii of the second pump surface toward a middle radius of the second pump surface.

7. The disc drive of claim 2 wherein the second, grooved pump surface has a spiral groove pattern.

8. The disc drive of claim 7 wherein the first pump surface is grooved and has a spiral groove pattern.

9. The disc drive of claim 1 wherein:

the first pump surface is grooved;

the first and second pump surfaces have inner and outer radii;

the first pump surface has a groove pattern that is formed of a first plurality of spaced grooves which extend from the inner radius of the first pump surface and terminate near the middle radius of the first pump surface; and the second pump surface has a groove pattern that is formed of a second plurality of spaced grooves which extend from the outer radius of the second pump surface and terminate near the middle radius of the second pump surface.

10. The disc drive of claim 2 wherein the first annular plate is press fit onto the stationary member.

11. The disc drive of claim 2 wherein the second annular plate is press fit onto the rotatable member.

12. The disc drive of claim 2 wherein the first annular plate and the stationary member are formed of a single unitary piece of material.

13. The disc drive of claim 2 wherein the second annular plate and the rotatable member are formed of a single, unitary piece of material.

14. The disc drive of claim 1 wherein the second, grooved pump surface comprises at least one groove having a depth, and wherein the depth is 1.5 to 3 times the gap.

15. A disc drive motor for use in a disc drive having a sealed disc drive chassis providing a substantially contaminant-free cavity, the disc drive motor comprising:

a fixed member coupled to the disc drive chassis;

a rotor rotatable about the fixed member for rotatable carrying a magnetic storage disc in the contaminant-free cavity;

a bearing interconnecting the fixed member and the rotor; and a viscous pump seal located between the contaminant-free cavity and the bearing and comprising first and second annular plates which are separated by a gap, wherein the first annular plate is carried by one of the fixed member and the rotor and defines a first pump surface facing the gap and wherein the second annular plate is carried by the other of the fixed member and the rotor and defines a second, grooved pump surface facing the gap.

16. A disc drive motor for use in a disc drive having a sealed disc drive chassis providing a substantially contaminant-free cavity, the disc drive motor comprising:

a fixed member coupled to the disc drive chassis;

a rotor rotatable about the fixed member;

a magnetic storage disc carried by the rotor in the contaminant-free cavity;

a bearing coupled between the fixed member and the rotor;

an air flow path between the bearing and the contaminant-free cavity; and means for generating a viscous pump in the air flow path, which inhibits transfer of contaminants from the bearing to the contaminant-free cavity.

17. The disc drive of claim 16 wherein the means for generating the viscous pump seal comprises:

a first pump surface coupled to the rotor;

a second pump surface coupled to the fixed member and opposing the first pump surface, wherein the first and second pump surfaces each comprise first and second opposite edges and a middle region;

a gap between the first and second pump surfaces; and groove means formed in at least one of the first and second pump surfaces for pumping air along the first and second pump surfaces from the first and second; side edges toward the middle regions.

* * * * *

UNITED STATES PATENT AND TRADEMARK OFFICE
CERTIFICATE OF CORRECTION

PATENT NO.   : 5,841,607
DATED        : November 24, 1998
INVENTOR(S)  : Raquib U. Khan and Mohamed M. Rahman It is certified that error appears in the above-indentified patent and that said Letters Patent is hereby corrected as shown below:

Col. 7, line 33, delete "rotatable" (second Occ.) and insert--rotatably--.

Signed and Sealed this

Twenty-first Day of March, 2000

Attest:

Attesting Officer

Q. TODD DICKINSON

Commissioner of Patents and Trademarks